United States Patent
Hymel et al.

(10) Patent No.: US 6,313,736 B1
(45) Date of Patent: *Nov. 6, 2001

(54) METHOD AND APPARATUS IN A SELECTIVE CALL COMMUNICATION SYSTEM FOR IDENTIFYING A CATEGORY OF INFORMATION ASSOCIATED WITH A MESSAGE

(75) Inventors: James Allen Hymel, Lake Worth; Pedro Enrique Fong, Boca Raton, both of FL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/617,715

(22) Filed: Apr. 1, 1996

(51) Int. Cl.[7] ................................................ H04Q 7/00
(52) U.S. Cl. ........................ 340/7.56; 340/7.53; 455/701
(58) Field of Search .................. 340/825.44, 825.07, 340/7.2, 3.5, 7.56, 7.53; 455/38.1, 701; 364/188

(56) References Cited

U.S. PATENT DOCUMENTS

| | | | |
|---|---|---|---|
| 4,713,808 | | 12/1987 | Gaskill ................................. 370/314 |
| 4,897,835 | * | 1/1990 | Gaskill et al. ................... 340/825.44 |
| 5,157,391 | | 10/1992 | Weitzen ........................... 340/825.44 |
| 5,173,688 | * | 12/1992 | DeLuca et al. ................. 340/825.44 |
| 5,347,269 | * | 9/1994 | Vanden Heuvel et al. ..... 340/825.44 |
| 5,379,031 | * | 1/1995 | Mondrosch et al. ............ 340/825.07 |
| 5,644,627 | * | 7/1997 | Segal et al. ..................... 340/825.44 |
| 5,701,258 | * | 12/1997 | Harris et al. .................... 340/825.44 |
| 5,705,995 | * | 1/1998 | Laflin et al. .................... 340/825.44 |

* cited by examiner

*Primary Examiner*—Brian Zimmerman
*Assistant Examiner*—Yves Dalencourt
(74) *Attorney, Agent, or Firm*—Randi L. Dulaney (57) ABSTRACT

A method and apparatus in a selective call communication system is used for transmitting a message of a message type selected from non-maildrop and maildrop (504), wherein the message of maildrop type includes one of a plurality of categories of information. The controller (112) of the system is used for identifying the one of the plurality of categories of information to a user. The controller (112) transmits the message with an identifier (412, 414) for identifying one of a plurality of icons corresponding to the one of the plurality of categories of information. A selective call receiver (122) receives and decodes the message and the identifier (412, 414). The display (324) of the selective call receiver (122) is used for displaying the one of the plurality of icons, in response to receiving the identifier (412, 414).

4 Claims, 6 Drawing Sheets

PRIOR ART

METHOD AND APPARATUS IN A SELECTIVE CALL COMMUNICATION SYSTEM FOR IDENTIFYING A CATEGORY OF INFORMATION ASSOCIATED WITH A MESSAGE

FIELD OF THE INVENTION

This invention relates in general to a selective call communication system, and in particular to a selective call communication system for identifying a category of information associated with a message.

BACKGROUND OF THE INVENTION

Users of selective call receivers who subscribe to maildrop services will receive from a selective call communication system different types of informative messages. These messages can include, for example, caller pages, stock market quotes, email, and weather information. When receiving such messages, prior art systems utilize a blinking icon to alert the user of the selective call receiver that a message has been received. When a multiplicity of these messages are received, the same icon is repeated in a plurality of predetermined locations on a display to indicate that the user has received multiple maildrop messages.

Thus, a user subscribing to two or more services has no way of knowing the nature of the messages received without previewing each message, or alternatively by memorizing an icon location assigned to each maildrop service. As users subscribe to greater numbers of maildrop services, the inconvenience to users in having to preview messages or memorize icon locations increases.

Thus, what is needed is a selective call communication system for identifying a category of information associated with a message. In particular, it is desirable that the user of a selective call receiver be able to identify quickly and efficiently the type of message received without resorting to prior art methods that can require, for example, message previewing.

SUMMARY OF THE INVENTION

An aspect of the present invention is a method in a selective call communication system that transmits a message of a message type selected from non-maildrop and maildrop, wherein the message of maildrop type comprises one of a plurality of categories of information. The method is for identifying the one of the plurality of categories of information to a user. The method comprises transmitting in the message from a fixed portion of the system an identifier for identifying one of a plurality of icons corresponding to the one of the plurality of categories of information, in response to the message type being maildrop and the identifier being available, and displaying the one of the plurality of icons at a receiver for which the message is intended, in response to receiving the identifier.

A second aspect of the present invention is an apparatus in a selective call communication system that transmits a message of a message type selected from non-maildrop and maildrop, wherein the message of maildrop type comprises one of a plurality of categories of information. The apparatus is for identifying the one of the plurality of categories of information to a user. The apparatus comprises controller/transmitter means for transmitting in the message from a fixed portion of the system an identifier for identifying one of a plurality of icons corresponding to the one of the plurality of categories of information, in response to the message type being maildrop and the identifier being available, and receiver means for receiving and decoding the identifier. The receiver means comprises display means for displaying the one of the plurality of icons, in response to receiving the identifier.

A third aspect of the present invention is a selective call receiver in a selective call communication system that transmits from a fixed portion of the system a message of a message type selected from non-maildrop and maildrop, wherein the message of maildrop type comprises one of a plurality of categories of information. The selective call receiver is for identifying the one of the plurality of categories of information to a user, the selective call receiver comprises an antenna for intercepting a radio signal comprising the message, a receiver element coupled to the antenna for demodulating the message, and a processing system coupled to the receiver element for decoding and processing the message. The message comprises an identifier for identifying one of a plurality of icons corresponding to the one of the plurality of categories of information, in response to the message type being maildrop and the identifier being available. The selective call receiver further comprises a display coupled to the processing system for displaying the one of the plurality of icons, in response to receiving the identifier.

DESCRIPTION OF THE PREFERRED EMBODIMENT

Figure 1:
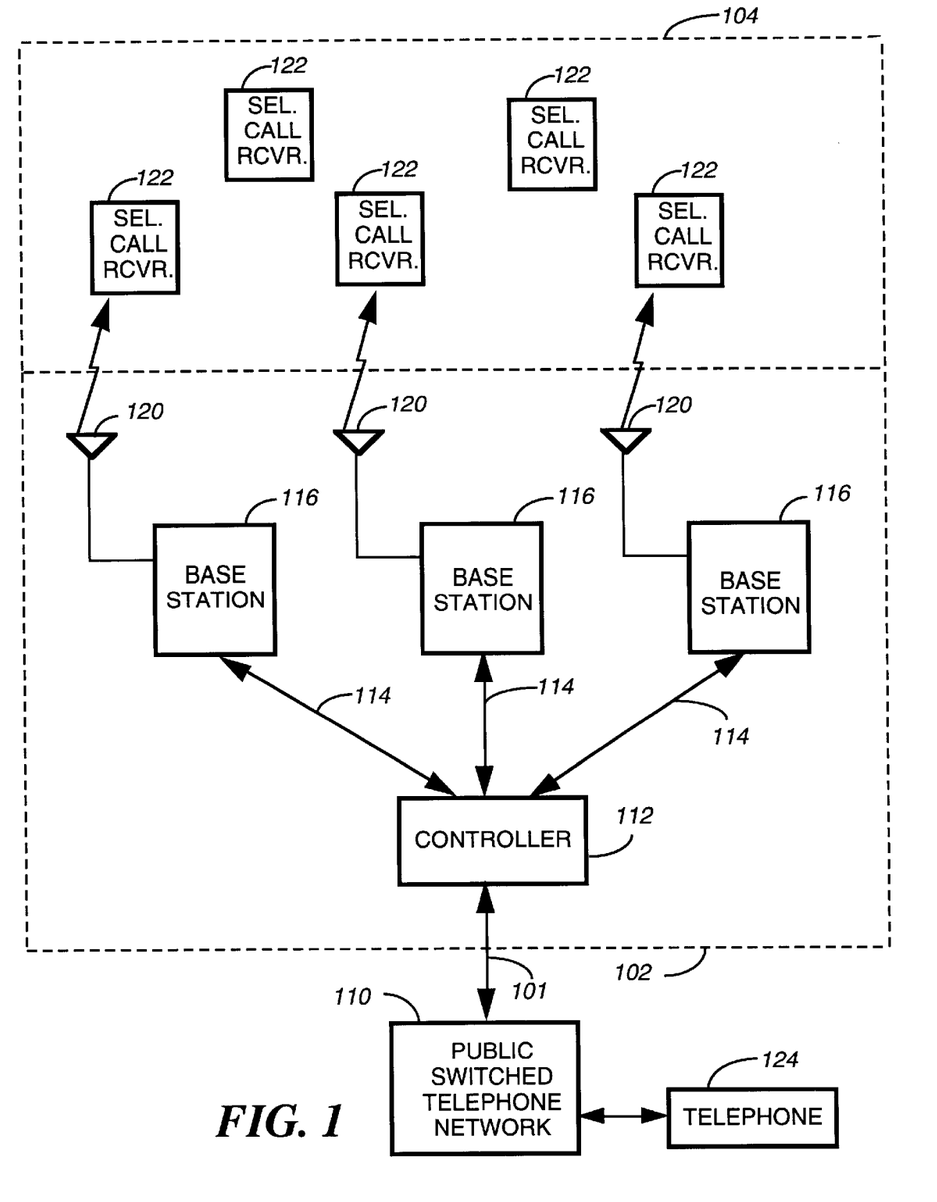
FIG. 1 is an electrical block diagram of a selective call communication system in accordance with the preferred embodiment of the present invention.

FIG. 1 is an electrical block diagram of a selective call communication system in accordance with the preferred embodiment of the present invention. The selective call communication system comprises a fixed portion 102 and a portable portion 104. The fixed portion 102 includes a plurality of base stations 116 for communicating with the portable portion 104, utilizing conventional radio frequency transmission techniques well known in the art, and coupled by communication links 114 to a controller 112 which controls the base stations 116.

The hardware of the controller 112 is preferably a combination of the Wireless Messaging Gateway (WMG™) Administrator! paging terminal and the RF-Conductor!™ message distributor manufactured by Motorola, Inc. The hardware of the base stations 116 is preferably a Nucleus® Orchestra! transmitter manufactured by Motorola, Inc. It will be appreciated that other similar hardware can be utilized for the controller 112 and base stations 116.

Each of the base stations 116 transmits radio signals to the portable portion 104 comprising a plurality of selective call receivers 122 via a transmitting antenna 120. The radio signals comprise selective call addresses and message transactions between the base stations 116 and the selective call receivers 122. The controller 112 preferably is coupled by conventional telephone links 101 to a public switched telephone network (PSTN) 110 for receiving selective call messages therefrom. The selective call messages comprise non-maildrop and maildrop messages received from the PSTN 110 by way of a caller using, for example, a conventional telephone 124 coupled to the PSTN 110 in a manner well known in the art. Messages can also originate from computer systems (not shown), such as those belonging to agencies providing stock quotes, weather information, and the like.

Message transmissions between the base stations 116 and the selective call receivers 122 preferably utilize an outbound protocol such as Motorola, Inc.'s well-known FLEX™ digital selective call signaling protocol. It will be appreciated that other communication protocols that operate in a selective call communication system and that are suitable to this invention can be used.

Figure 2:
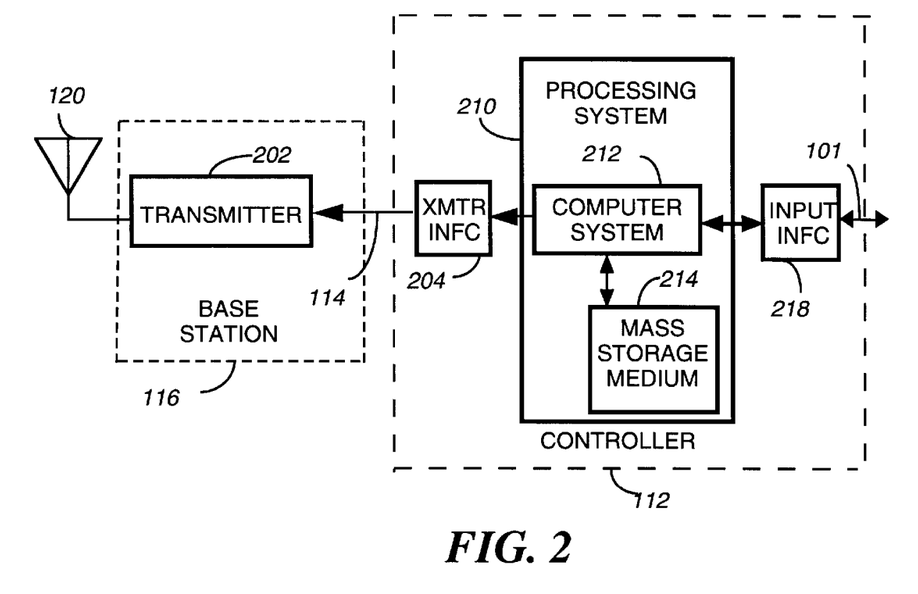
FIG. 2 is an electrical block diagram detailing the elements of a fixed portion of the selective call communication system in accordance with the preferred embodiment of the present invention.

FIG. 2 is an electrical block diagram of elements of the fixed portion 102 of the selective call communication system in accordance with the preferred embodiment of the present invention. The fixed portion 102 includes the controller 112 and the plurality of base stations 116.

A processing system 210 directs the operation of the controller 112. The processing system 210 preferably is coupled through a transmitter interface 204 for controlling a transmitter 202 of the base station 116. The processing system 210 is also coupled to an input interface 218 for communicating with the PSTN 110 through the telephone links 101 for receiving selective call message originations.

In order to perform the functions necessary in controlling the elements of the controller 112, as well as the elements of the base stations 116, the processing system 210 preferably includes a conventional computer system 212, and a conventional mass storage medium 214. The mass storage medium 214 includes subscriber user information such as, for example, addressing and programming options of the selective call receivers 122. The computer system 212 is programmed by way of software included in the mass storage medium 214.

The computer system 212 preferably comprises a plurality of processors such as, for example, VME Sparc™ processors manufactured by Sun Microsystems, Inc. These processors include memory such as dynamic random access memory (DRAM), which serves as a temporary memory storage device for scratch pad processing such as, for example, storing messages originated by callers, and protocol processing of messages destined for the selective call receivers 122. The mass storage medium 214 is preferably a conventional hard disk mass storage device.

It will be appreciated that other types of computer systems 212 can be utilized, and that additional computer systems 212 and mass storage media 214 of the same or alternative type can be added as required to handle the processing requirements of the processing system 210.

The base stations 116 include a conventional transmitter 202 for transmitting messages by way of RF signals to the selective call receivers 122. These RF signals preferably utilize frequency shift-keyed (FSK) frequency modulation. It will be appreciated that, alternatively, other modulation schemes that are suitable to this invention can also be used.

Figure 3:
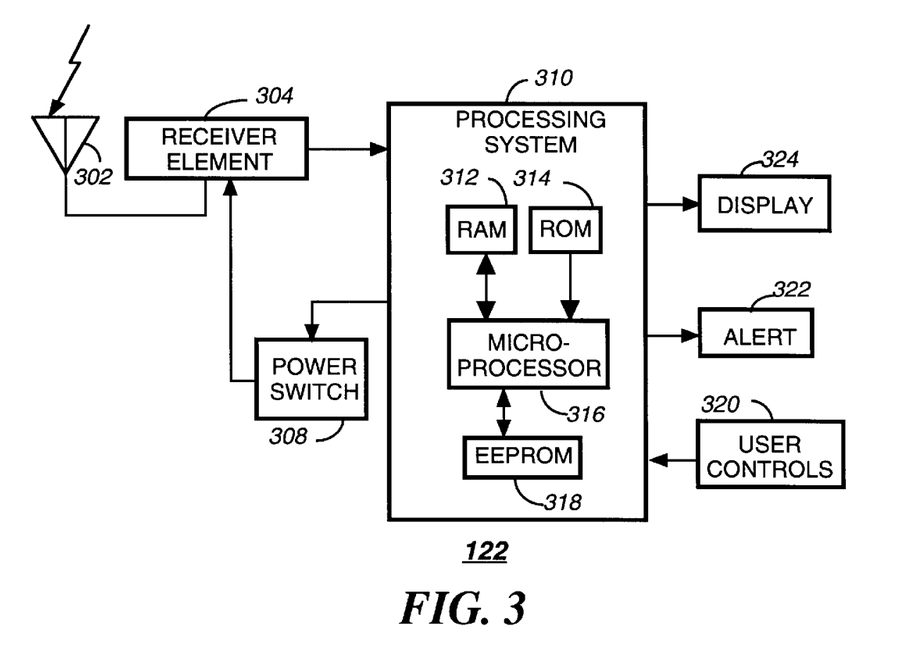
FIG. 3 is an electrical block diagram of a selective call receiver in accordance with the preferred embodiment of the present invention.

FIG. 3 is an electrical block diagram of the selective call receiver 122 in accordance with the preferred embodiment of the present invention. The selective call receiver 122 comprises an antenna 302 for intercepting RF signals from the base stations 116. The antenna 302 is coupled to a receiver element 304 employing conventional demodulation techniques for receiving the communication signals transmitted by the base station 116. Radio signals received by the receiver element 304 produce demodulated information, which is coupled to a processing system 310 for processing received messages.

A conventional power switch 308, coupled to the processing system 310, is used to control the supply of power to the receiver element 304, thereby providing a battery saving function.

To perform the necessary functions of the selective call receiver 122, the processing system 310 includes a microprocessor 316, a random access memory (RAM) 312, a read-only memory (ROM) 314, and an electrically erasable programmable read-only memory (EEPROM) 318. Preferably, the processing system 310 is similar to the M68HC08 micro-controller manufactured by Motorola, Inc.

It will be appreciated that other similar processors can be utilized for the processing system 310, and that additional processors of the same or alternative type can be added as required to handle the processing requirements of the processing system 310. It will be also appreciated that other types of memory, e.g., EEPROM or FLASH, can be utilized for the ROM 314, as well as the RAM 312. It will be further appreciated that the RAM 312 and the ROM 314, singly or in combination, can be manufactured as an integral portion of the microprocessor 316.

The processing system 310 is programmed by way of the ROM 314 to process incoming messages. The processing system 310 decodes an address in the demodulated data of the received message, compares the decoded address with one or more addresses stored in the EEPROM 318, and when a match is detected, proceeds to process the remaining portion of the message.

Once the processing system 310 has processed the message, it stores the message in the RAM 312, and a call alerting signal is generated to alert a user that a message has been received. The call alerting signal is directed to a conventional audible or tactile alerting device 322 for generating an audible or tactile call alerting signal.

The message can be accessed by the user through user controls 320, which provide functions such as lock, unlock, delete, read, etc. More specifically, by the use of appropriate functions provided by the user controls 320, the message is recovered from the RAM 312, and conveyed to the user by way of a display 324, e.g., a conventional liquid crystal display (LCD). It will be appreciated that, alternatively, the display 324 can be accompanied by an audio circuit (not shown) for conveying voice messages.

Figure 4:
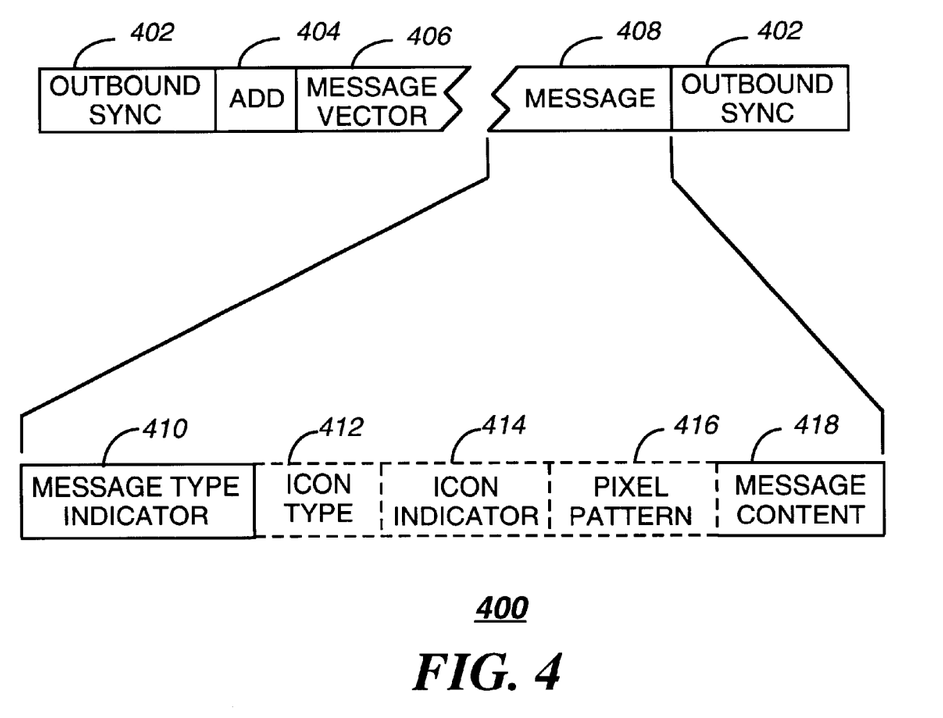
FIG. 4 is a timing diagram depicting a communication protocol used by the selective call communication system in accordance with the preferred embodiment of the present invention.

FIG. 4 is a timing diagram depicting a communication protocol 400 used by the selective call communication system in accordance with the preferred embodiment of the present invention. The elements of the communication protocol 400 comprise an outbound sync 402, a selective call address 404, a message vector 406 and a message 408. The outbound sync 402 provides the selective call receiver 122 a means for synchronization utilizing techniques well known in the art. The selective call address 404 identifies the selective call receiver 122 for which the message 408 is intended. The message vector 406 points in time within the signal format to the position of the message 408 to be received by the selective call receiver 122.

A first portion of the message 408 includes a control portion comprising a message type indicator 410 for identifying the message type as either a non-maildrop message or a maildrop message. The remaining message portion of the message 408 comprises one of three alternatives. In the first alternative, when the message type is a non-maildrop message, the remaining message portion is the message content 418 sent from the message originator. The second and third alternatives are used for when the message type is a maildrop message. The second alternative adds an icon type 412, and an icon indicator 414 prior to transmission of the message content 418. The third alternative adds a pixel pattern 416 after the icon indicator 414 and before the message content 418.

The icon type 412 is a predetermined value in a predetermined portion of the message 408 used for determining the type of icon processing to be performed by the selective call receiver 122. The icon indicator 414 is an identifier for identifying one of a plurality of icons corresponding to one of a plurality of categories of information, in response to the message type indicator 410 being a maildrop message, and an identifier being available for the icon indicator 414. The pixel pattern 416 is icon information used by the selective call receiver 122 for creating customized icons. The function of these parameters will become more apparent during the discussion of the operations of the controller 112 and the selective call receiver 122 below.

Figure 5:
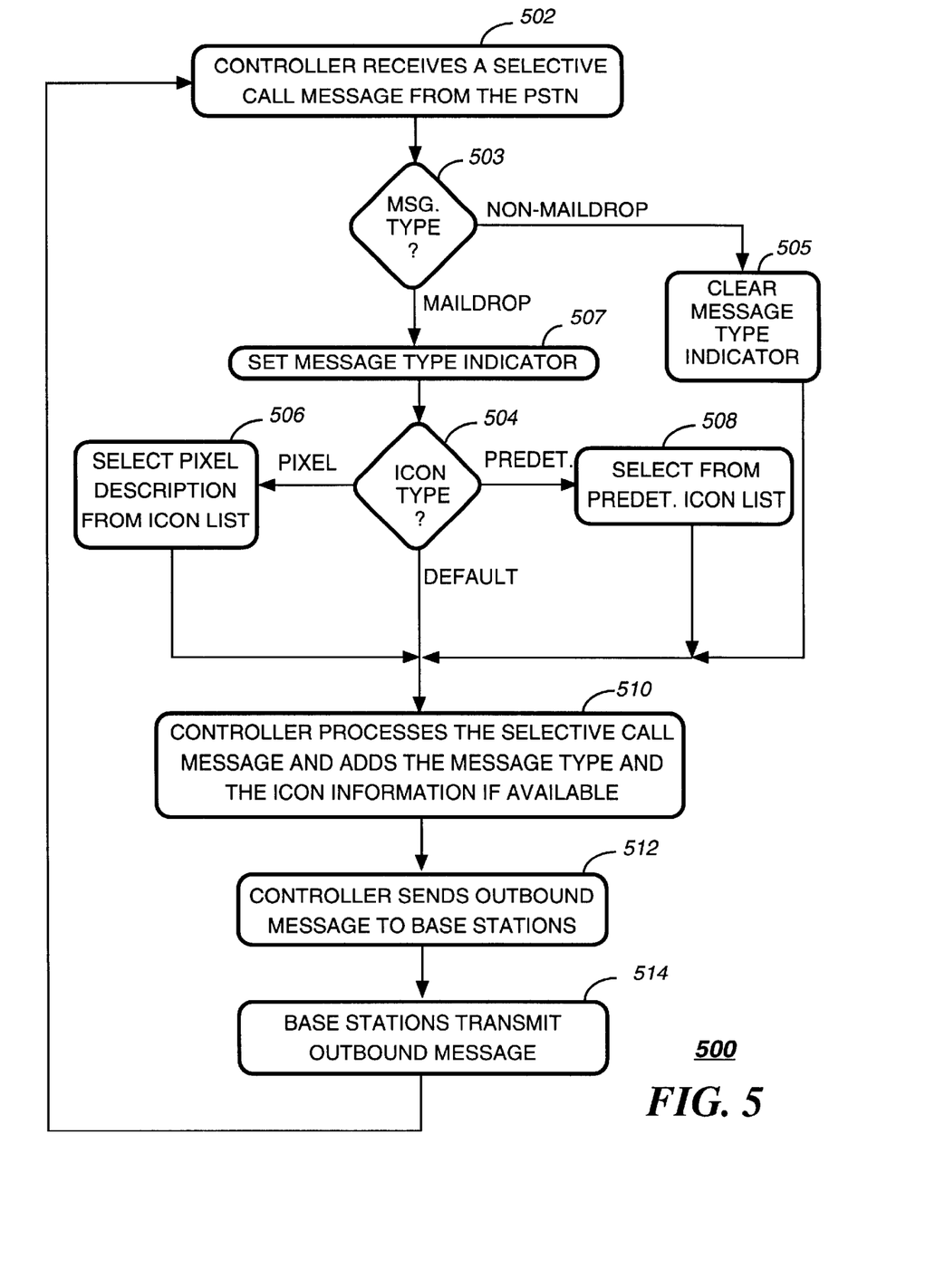
FIGS. 5 and 6 are flow charts depicting the operations of the controller and the selective call receiver in accordance with the preferred embodiment of the present invention.

FIG. 5 is a flow chart 500 depicting the operation of the controller 112 in accordance with the preferred embodiment of the present invention. The flow chart 500 begins with step 502 where the controller 112 receives a message from the PSTN 110. In step 503 the controller 112 determines the message type. If the message type is non-maildrop, then the controller proceeds to step 505 to clear the message type indicator 410, and then goes to step 510. If, on the other hand, the message type is maildrop, the controller 112 sets in step 507 the message type indicator 410 and then proceeds to step 504. In step 504 the controller 112 determines the icon type. When the icon type is the default maildrop icon, the controller 112 proceeds directly to step 510. When the icon type is a predetermined maildrop icon, the controller 112 selects 508 one of a predetermined plurality of icon identifiers corresponding to one of a plurality of predetermined icons stored in the EEPROM 318 of the selective call receiver 122. When the icon type is a custom pixel, the controller 112 selects 506 a pixel description from an icon list programmed into the mass storage medium 214. After the icon selection has been made, the controller 112 proceeds to step 510.

In step 510 the controller processes the selective call message and adds the message type indicator 410 and the subsequent icon information of either steps 506 or 508. This icon information comprises the icon type 412, and the icon indicator 414 if step 508 was performed, and additionally the pixel pattern 416 if step 506 is selected by the controller 112. The predetermined value of the icon type 412 is preferably the digital value zero (or null) to identify that icon information follows in subsequent bytes of the remaining message portion. Any other value for the icon type 412 preferably indicates that the subsequent bytes are part of the message content 418 itself, and that the default maildrop icon should be displayed by the selective call receiver 122.

The icon indicator 414 is preferably a digital value not equal to zero that indicates one of a plurality of icon selections (e.g., 1 through 50). A value of zero is preferably used for indicating that a pixel pattern 416 is to be used instead. The pixel pattern 416 is a predetermined number of bytes of pixel data (e.g., 5 bytes) for displaying a customized icon on the display 324 of the selective call receiver 122.

Once the step 510 has been completed the controller 112 has created an outbound message destined for a selective call receiver 122 in the portable portion 102 of the selective call communication system. The controller 112 proceeds to step 512 where it sends the outbound message to the base stations 116. The base stations 116 thereafter transmit the message 408 to the selective call receiver 122 in step 514. The controller 112 proceeds to step 502 to receive new selective call messages.

Figure 6:
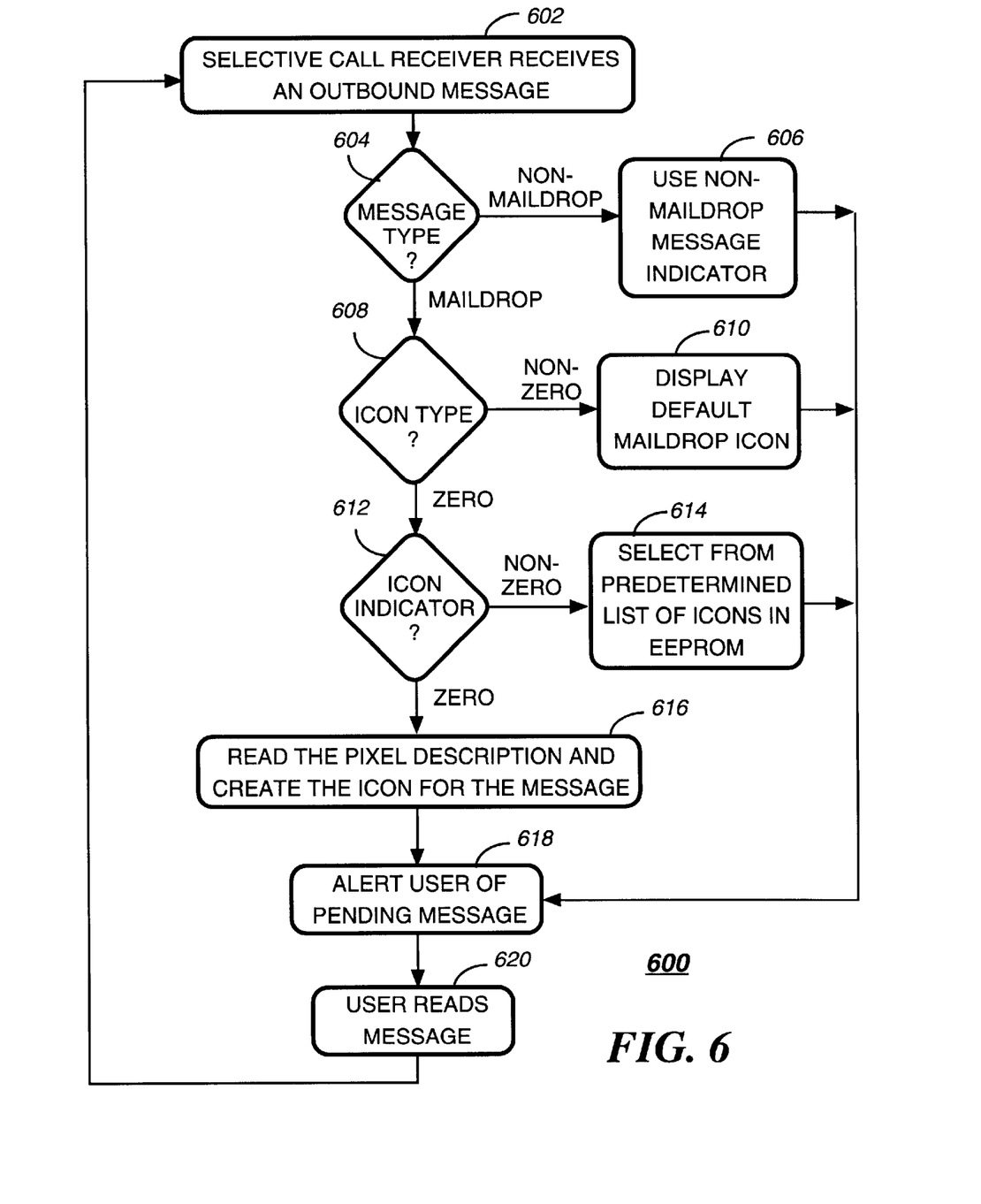

FIG. 6 is a flow chart 600 depicting the operation of the selective call receiver 122 in accordance with the preferred embodiment of the present invention. The flow chart 600 begins with step 602 where the processing system 310 receives and decodes the outbound message transmitted by the base stations 116. In step 604 the processing system 310 determines the message type from the message type indicator 410 included in the outbound message.

When the message type is non-maildrop, the processing system 310 proceeds to step 606 where it selects and displays a predetermined non-maildrop message icon. When the message type is maildrop, the processing system 310 proceeds to step 608 where it checks the icon type 412. When the icon type 412 is a non-zero value, the processing system 310 proceeds to step 610 where a default maildrop icon is selected and displayed. When the icon type 412 is zero, the processing system 310 proceeds to step 612 where it checks the icon indicator 414. When the icon indicator 414 is non-zero, the processing system 310 proceeds to step 614 where it selects and displays a predetermined maildrop message icon from a predetermined list of icons stored in the EEPROM 318. When the icon indicator 414 is zero, the processing system 310 proceeds to step 616. In step 616 the processing system 310 reads the pixel pattern 416 included in the outbound message and creates a custom icon for alerting the user of the pending maildrop message.

After the applicable step 606, 610, 614, or 616, the processing system 310 alerts the user of a pending message in step 618. The user is alerted by way of the alerting device 322, and the display 324. The display 324 informs the user as to the category of information, e.g., weather, stocks, sports, etc., associated with the pending message by way of the icon selected and displayed in step 606, 610, 614, or 616. In step 620 the user reads the selective call message by selecting appropriate functions provided by the user controls 320. Thereafter, the processing system 310 proceeds to step 602 for receiving further messages.

Figure 7:
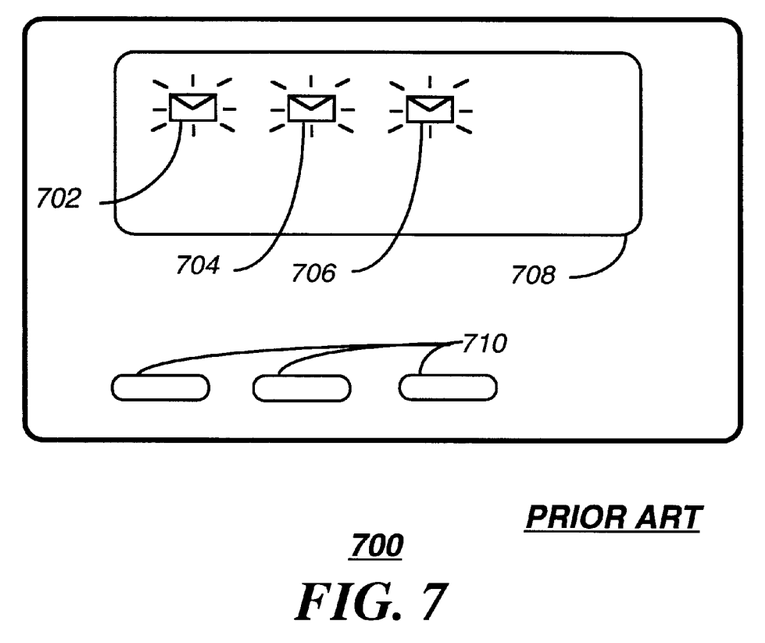
FIG. 7 depicts a prior art selective call receiver displaying a plurality of similar maildrop icons.

FIG. 7 is a front view of a prior art selective call receiver 700 with maildrop icons. The selective call receiver 700 comprises a display 708, user controls 710, and three example maildrop icons 702, 704, 706. The user controls 710 provide functions for the user to retrieve messages received. When a message is received by the selective call receiver 700, the user is alerted by way of an audible or tactile alerting device included in the selective call receiver 700. The selective call receiver 700 also informs the user of the received messages by way of the maildrop icons 702, 704, 706 presented on the display 708.

When a maildrop message is received, one of the maildrop icons 702, 704, 706 corresponding to the maildrop service is presented on the display 708. The selective call receiver 700 displays unread maildrop messages in a blinking fashion, and read messages with a non-blinking maildrop icon. This allows a user to readily determine which maildrop messages have been read, which have not. To know which maildrop service corresponds to a given one of the maildrop icons 702, 704, 706 the user must memorize the correspondence between the maildrop service and the location of the maildrop icon 702, 704, 706 for the service. This does not present a problem if the user subscribes to only one or two maildrop services. If, on the other hand, the user subscribes to many maildrop services, this prior art method of using maildrop icon location for identification of each maildrop service can make it difficult for the user to determine which maildrop service has sent a message, unless the user actually reads the message.

Figure 8:
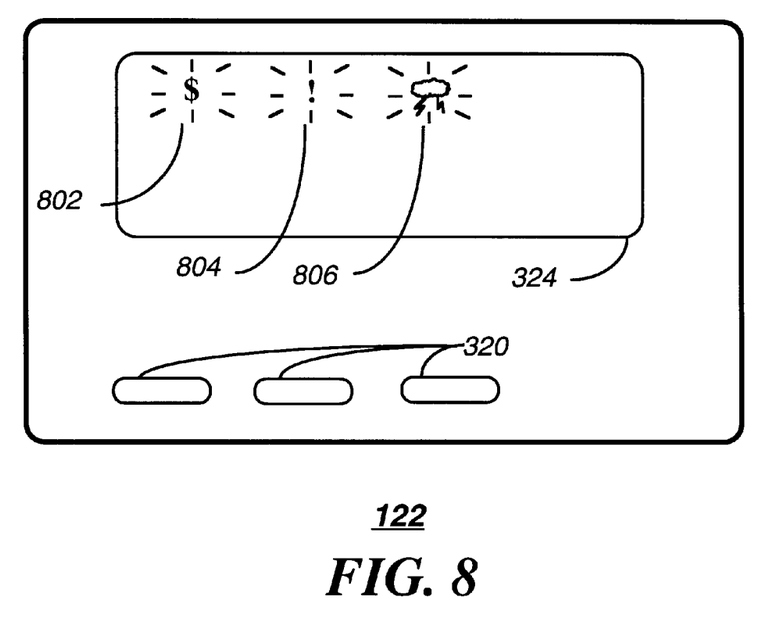
FIG. 8 depicts a selective call receiver displaying a plurality of descriptive maildrop icons in accordance with the preferred embodiment of the present invention.

FIG. 8 is a front view 800 of the selective call receiver 122 depicting maildrop icons in accordance with the preferred embodiment of the present invention. The selective call receiver 122 comprises the display 324, the user controls 320, and maildrop icons 802, 804, 806. The user controls 320 provide functions for the user to retrieve messages sent by the base stations 116. When a message is received by the selective call receiver 122, the user is alerted by way of the audible or tactile alerting device 322 included in the selective call receiver 122. The selective call receiver 122 also informs the user of received messages by way of the maildrop icons 802, 804, 806 presented on the display 324.

When a message is received, a unique maildrop icon corresponding to the maildrop service is presented on the display 324. The selective call receiver 122 displays unread maildrop messages in a blinking fashion, and read messages with a non-blinking maildrop icon. This allows a user to readily determine which maildrop messages have been read, and which have not.

In this example, the three maildrop icons 802, 804, 806 each represents a unique maildrop service. Maildrop icon 802 ("$" symbol) represents a maildrop service for stock market information (e.g., stock quotes, Dow Jones Industrial average, etc.), maildrop icon 804 ("!" symbol) represents a late breaking news service, and maildrop icon 806 (cloud and lightning symbol) represents weather information. When a particular maildrop message is received by the selective call receiver 122, it is associated with the unique maildrop icon 802, 804, 806 corresponding to the type of service message received. Thus, for example, all weather information messages will be stored under the weather information maildrop icon 806, all late breaking news messages will be stored under a late breaking news maildrop icon, 804, and so on.

Once one or more maildrop messages have been received and the appropriate maildrop service icons have been displayed, the user can easily determine which types of services have pending messages and can select, by personal choice, which types of messages will be read. This method of maildrop message identification advantageously reduces user confusion and thus provides a more user friendly display.

It will be appreciated that the selective call receiver 122 can have as many maildrop icons representing unique services as are appropriate for a user application. It will be further appreciated that many other icons and icon styles can be utilized as well to inform the user concerning what types of message services have sent messages. Various other changes and modifications may reasonably occur to one of ordinary skill in the art. Accordingly, the scope of the invention is delimited only in accordance with the following claims.

Thus, it should be apparent by now that the present invention provides a novel method and apparatus for identifying a category of information associated with a message. In particular, the user of a elective call receiver 122 can now quickly identify the category of a message by the icon associated with the stored message. In addition, the present invention advantageously provides a method for supporting future maildrop services without recalling selective call receivers 122 active in the field. This can be done by having the fixed portion 102 of the selective call communication system transmit a pixel pattern 416 to the selective call receiver 122 providing for the creation of a new icon associated with a new service.

What is claimed is:

1. A method in a selective call communication system including a fixed portion and at least one selective call receiver, wherein the selective call communication system transmits a message of a message type selected from a message of a non-maildrop type and a message of a maildrop type, wherein the message of the maildrop type comprises one of a plurality of categories of information, the method for identifying the one of the plurality of categories of information to a user, the method comprising the steps of:

transmitting the message from the fixed portion of the system wherein the message comprises:
a message type indicator, wherein the message type indicator identifies the message type as either the non-maildrop type or the maildrop type, wherein the maildrop type comprises the one of the plurality of categories of information,
an icon type, wherein the icon type identifies the type of icon processing to be performed by the selective call receiver,
an icon indicator, wherein the icon indicator follows in a subsequent portion of the message when the icon type is a predetermined icon type value, and further wherein the icon indicator identifies one of a plurality of icons corresponding to the one of the plurality of categories of information for displaying on the display of the selective call receiver, and
a pixel pattern, wherein the pixel pattern is a predetermined number of bytes of pixel data, and wherein the pixel pattern follows in a remaining portion of the message when the icon indicator is a predetermined icon indicator value; and
displaying the one of the plurality of icons by the selective call receiver for which the message is intended, in response to receiving the message,
wherein the displaying comprises creating a customized icon from the pixel pattern.

2. A selective call communication system for communication of a message of a message type selected from a message of a non-maildrop type and a message of a maildrop type, wherein the message of the maildrop type comprises one of a plurality of categories of information, the message including means for identifying the one of the plurality of categories of information to a user, the selective call communication system comprising:

a controller/transmitter means for transmitting the message from a fixed portion of the system, wherein the message comprises:
a message type indicator, wherein the message type indicator identifies the message type as either the non-maildrop type or the maildrop type, wherein the maildrop type comprises the one of the plurality of categories of information,
an icon type, wherein the icon type identifies the type of icon processing to be performed by the selective call receiver, and an icon indicator, wherein the icon indicator follows in a subsequent portion of the message when the icon type is a predetermined icon type value, wherein the icon indicator identifies one of a plurality of icons corresponding to the one of the plurality of categories of information for displaying on the display of the selective call receiver, and a pixel pattern, wherein the pixel pattern is a predetermined number of bytes of pixel data, and wherein the pixel pattern follows in a remaining portion of the message when the icon indicator is a predetermined icon indicator value; and a selective call receiver for receiving and decoding the message, the selective call receiver comprising:

a display for displaying the one of the plurality of icons, in response to receiving the message, wherein the display is programmed to create a customized icon from the pixel pattern.

3. A selective call receiver in a selective call communication system that transmits from a fixed portion of the selective call communication system a message of a message type selected from a message of a non-maildrop type and a message of a maildrop type, wherein the message of the maildrop type comprises one of a plurality of categories of information, the selective call receiver for identifying the one of the plurality of categories of information to a user, the selective call receiver comprising:

an antenna for intercepting a radio signal comprising the message;

a receiver element coupled to the antenna for demodulating the message; and a processing system coupled to the receiver element for decoding and processing the message, wherein the message comprises:

a message type indicator, wherein the message type indicator identifies the message type as either the non-maildrop type or the maildrop type, wherein the maildrop type comprises the one of the plurality of categories of information, an icon type, wherein the icon type identifies the type of icon processing to be performed by the selective call receiver, and an icon indicator, wherein the icon indicator follows in a subsequent portion of the message when the icon type is a predetermined icon type value, wherein the icon indicator identifies one of a plurality of icons corresponding to the one of the plurality of categories of information for displaying on the display of the selective call receiver, a pixel pattern, wherein the pixel pattern is a predetermined number of bytes of pixel data, and wherein the pixel pattern follows in a remaining portion of the message when the icon indicator is a predetermined icon indicator value; and a display coupled to the processing system for displaying the one of the plurality of icons, in response to receiving the message, wherein the processing system is programmed to control the display to create a customized icon from the pixel pattern.

4. In a selective call communication system having at least one selective call receiver, the selective call receiver including a display for displaying at least one of a plurality of icons in response to receiving a message, a communication protocol for communicating the message, the communication protocol comprising:

a message type indicator, wherein the message type indicator identifies the message type as either a non-maildrop type or a maildrop type, wherein the maildrop type comprises one of a plurality of categories of information;

an icon type, wherein the icon type identifies the type of icon processing to be performed by the selective call receiver;

an icon indicator, wherein the icon indicator follows in a subsequent portion of the message when the icon type is a predetermined icon type value, and further wherein the icon indicator identifies one of a plurality of icons corresponding to the one of the plurality of categories of information for displaying on the display of the selective call receiver; and a pixel pattern, wherein the pixel pattern is a predetermined number of bytes of pixel data for displaying a customized icon on the display of the selective call receiver, and further wherein the pixel pattern follows in a remaining portion of the message when the icon indicator is a predetermined icon indicator value.

* * * * *